Feb. 21, 1967 P. M. LEAVY, JR., ETAL 3,305,689

ELECTRO-OPTICAL SIGNAL CONVERTER SYSTEM

Filed June 26, 1963 2 Sheets-Sheet 1

INVENTORS.
PAUL M. LEAVY JR.
JOHN S. STROBEL

BY

ATTORNEY

INVENTORS.
PAUL M. LEAVY JR.
JOHN S. STROBEL
BY
ATTORNEY

United States Patent Office 3,305,689

Patented Feb. 21, 1967

3,305,689

ELECTRO-OPTICAL SIGNAL CONVERTER SYSTEM

Paul M. Leavy, Jr., Lynnfield, Mass., and John S. Strobel, Nashua, N.H., assignors to Sanders Associates, Inc., Nashua, N.H., a corporation of Delaware Filed June 26, 1963, Ser. No. 290,729
25 Claims. (Cl. 250—227)

The invention relates to electro-optical signal converters, and more particularly to an arrangement for generating an electrical signal which is time-coincident with a selected visual signal of instantaneous amplitude appearing on a cathode ray tube screen.

It is common present-day practice in certain electronic systems to provide visual displays of intelligible information related to the system operation. For example, in radar and computer systems characters or symbols are commonly displayed for visual observation upon the screen of a "read out" cathode ray tube in response to electronic writing signals impressed upon the tube. Usually, a plurality of display symbols are written on the tube screen successively, the symbol sites being closely adjacent to each other.

In such arrangements, it is sometimes desirable for control purposes to generate an electrical signal indicative of the visual display of a selected character or symbol upon the screen of the display tube, which generated signal is time-coincident with the symbol writing pulse. It is also desirable to detect the writing pulse of such a selected symbol under varying conditions of ambient light. Electro-optical mechanisms provided for detecting selected visual symbols and generating any electrical signal time-coincident therewith must, therefore, be sufficiently directional to capture radiant energy solely from the site of the selected symbol without interference from radiant energy emanating from adjacent symbol sites, or due to ambient light conditions.

In such visual signal detecting and converting arrangements, difficulties have also been encountered due to noise caused by the persistence of visual signals on the tube screen. This is so, since display tube screens are usually of the multiphosphor coated type which may contain, for example, red phosphors and blue phosphors. The color of the phosphor does not matter as long as the phosphors have different wave length response. For example, red phosphors, when excited by an electronic writing pulse, produce luminous radiation which, characteristically, has a relatively slow "rise" time and slow "decay" time. This "red" luminous signal, thus, is relatively persistent. On the other hand, for example, "blue" phosphors, when excited by a writing pulse, characteristically, have a relatively fast "rise" time and fast "decay" time. The "blue" luminous signal, therefore, does not persist by comparison with the slower decay of the other element. With the usual sequence of wiriting pulses, the persistent "tail" of the red phosphor luminous signal (due to its characteristic relatively slow decay time) often overlaps the leading edge of the next succeeding writing pulse (the leading edge of the blue phosphor luminous signal of characteristically fast "rise" time), resulting in noise which interferes with generation of the desired intelligible electrical control signals.

It is, therefore, desirable that the electro-optical signal detecting and generating mechanism be sufficiently selective with respect to luminous radiation to detect solely the leading edge of the writing pulse for the selected symbol being written upon a multiphosphor cathode ray tube screen.

It is also desirable to provide supervisory means which visually indicate that the electro-optical mechanism has detected the desired radiant energy signal and properly generated a time-coincident electrical signal in response to such detection.

It is, therefore, an object of the invention to provide an electro-optical mechanism which is sufficiently directional to respond solely to radiant energy generated at a preselected area.

It is another object to provide a mechanism for generating an electrical signal in response to radiant energy caused by a writing pulse on the screen of a cathode ray tube, while minimizing interference to such generation due to noise and ambient light.

It is another object to provide a system for generating an electrical signal in response to radiant energy caused by a writing pulse on the screen of a cathode ray tube, which signal automatically adjusts the system gain to compensate for varying ambient illumination and variation in cathode ray tube brightness without the intervention of an operator.

It is a further object to provide an arrangement for generating a time-coincident electrical signal in response to the appearance of a predetermined visual signal of instantaneous amplitude on the screen of a multiphosphor cathode ray tube.

It is still a further object to provide such an electro-optical arrangement which includes supervisory means to provide a visual indication that the system is operating properly, both electrically and optically.

The invention involves providing means for visually selecting and indicating any one of a plurality of certain symbol display areas on the screen of a cathode ray tube. The mechanism detects or "captures" only radiant energy pulses of predetermined characteristics, appearing within the selected and indicated display area, and is non-responsive to radiant energy of other energy characteristics, or which occurs outside such area. The detected radiant energy pulse is converted to an electrical signal which is time-coincident with such detected radiant pulse. Supervisory means are provided for indicating proper operation of the mechanism.

In carrying out the invention, according to a preferred embodiment, a flexible conduit containing light conducting fibers and electrical conductors is provided and terminated in a tubular pencil which may be pointed towards a desired character site on the screen of a display tube screen. At the other end of the flexible conduit, the light fibers are separated into two fiber bundles in a Y configuration. The bundles terminate in a remote housing. Light from a light source is filtered in the housing and fed into the end of one of the fiber bundles for transmission to the pencil for projection onto the tube screen. The other bundle terminates at a second light filter at the input of a photo-multiplier tube to convey light thereto from an area external to the light pencil. This input filter accepts only a certain color light and prevents all other light colors from affecting the phototube. The photomultiplier tube, in turn, generates an electrical signal in response to such certain color light, which signal is amplified to provide a desired output electrical signal.

The light source generates light which is filtered to provide light of only a selected color which is not accepted by the input filter. Such selected color light is transmitted through the light transmitting fibers to the pencil. At the pencil a lens or optical system focuses the light into a projected beam to define the "capture" area at any distance from the end of the transmitting fiber bundle. Such projected beam, termed a "finder" beam, is visible and illuminates a selected character site on the tube screen when the pencil is held at such certain distance therefrom. The beam defines the "capture" area of radiation from the screen of the cathode ray display tube. When a writing pulse generates radiant energy in the "capture" area, such radiant energy by the process of reciprocity is projected through the pencil's optical system onto the end of the receiving fiber bundle. The receiving fiber bundle conveys the light to the input filter in front of the photomultiplier tube in the remote housing. The optical system, thus, rejects some ambient light and radiant energy from adjacent character sites. Since the photomultiplier responds to both the continuous background of ambient light and to the time varying light from the cathode ray tube, the purpose of the filter is to reduce the magnitude of the photo current flowing within the photomultiplier tube so that the electrical noise in the bandwidth corresponding to the rise time of the fast varying phosphor component is small compared to the magnitude of the electrical signal due to the fast time varying phosphor component. The input filter allows passage only of light of a certain color and rejects all other color light, causing the photo-multiplier tube to respond only to light radiated from the desired phosphor component of the multiphosphor cathode ray tube screen.

In the preferred embodiment, electrical signal generation in response to radiant energy detection is prevented until the desired character site is located by the "finder" beam. A supervisory control provides a visual indication that an electrical signal has been generated from the located character site by automatically extinguishing the "finder" beam upon generation of the desired signal.

Features and advantages of the invention will be seen from the above and from the following description of operation when considered in conjunction with the drawings, in which.

Figures 1, 2, 3, 5:
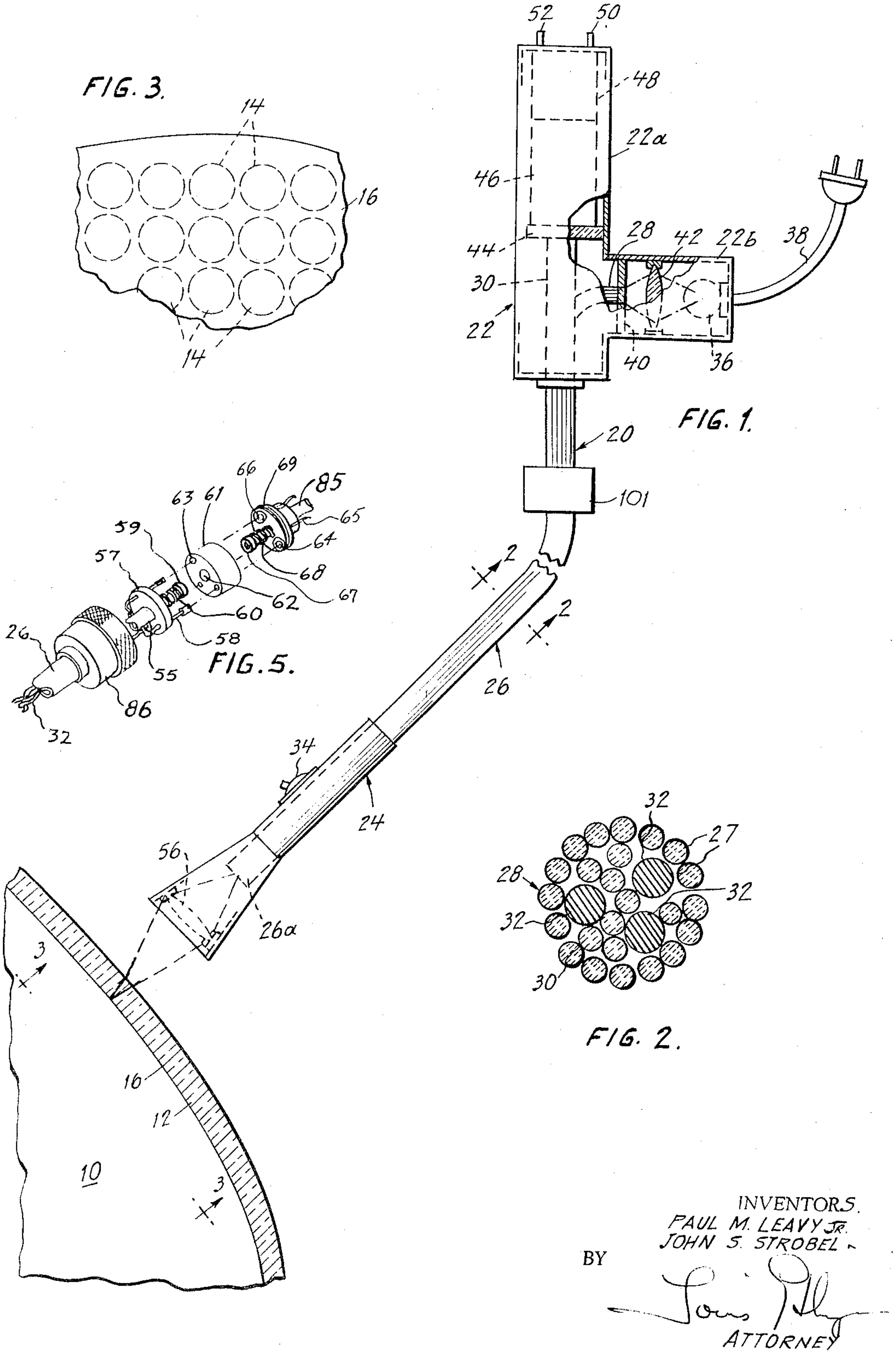
FIG. 1 is a simplified schematic representation with portions broken away and portions in section of the electro-optical system embodying the invention.
FIG. 2 is a cross-sectional view taken along the line 2—2 of FIG. 1.
FIG. 3 is a schematic front view of a portion of the screen of a cathode ray tube taken along line 3—3 of FIG. 1, and showing various closely spaced symbol sites.
FIG. 5 is an exploded view of an electro-optical connector shown in block form in FIG. 1.

Referring to FIGS. 1 to 3 of the drawings, 10 designates generally a portion of a cathode ray display tube of the type having a multiphosphor coated screen 12. Closely spaced cymbols or character sites 14 (FIG. 3) are provided on the inside face 16 (FIG. 1) of tube screen 12. Characters or symbols may be electronically written on screen 12 at character sites 14 by means of electronic writing pulses.

Numeral 20 designates generally a portable electro-optical signal converter mechanism. Mechanism 20 consists of a housing 22, having two compartments **22*a* and 22*b*, and a tubular pencil 24 connected to housing 22 by a flexible conduit 26. Conduit 26 consists of a plurality of radiant energy conducting filaments, such as glass fibers 27, and electrical conductors 32. While the conductors 32 are shown interspersed among the glass fibers they may be arranged in any fashion, such as outside the fiber bundles or entirely separate from the fiber bundles. Some of the fibers 27, which in one embodiment, for example, have a diameter of 20 to 30 microns, are utilized to convey radiant energy from housing 22 to pencil 24 for projection onto screen 12 of cathode ray tube 10, and will be referred to herein as output fiber bundle 28. The other light conducting fibers are used for conducting radiant energy from pencil 24 to housing 22 and are herein termed input fiber bundle 30. The block designated by reference symbol 101** is an electro-optical connector shown in exploded view form in FIG. 5.

As can be seen in FIG. 2, in one embodiment of the invention, output bundle 28 of fibers 27 for conducting light from housing 22 to pencil 24 is preferably in the form of a ring forming the periphery of conduit 26. Input fiber bundle 30 for conducting radiant energy to housing 22 is placed in the inside of the ring.

Electrical wires 32 connect the contacts of a manual spring return switch 34 (FIG. 1) mounted on pencil 24 to the mechanism circuitry in housing 22.

Compartment **22*b* of housing 22 contains a light source 36 which may be energized from any suitable source (not shown) through electrical connecting leads 38. Light transmitting output fiber bundle 28 at a point inside housing 22 branches off from main conduit 26 towards compartment 22*b* and terminates at an optical filter 40. Filter 40 preferably is selected of filtering characteristics to allow only the passage of radiant energy which is not accepted by an optical filter 44 positioned at the optical input to photomultiplier tube 46 in housing compartment 22*a***.

If desired, an optical system 42 for projecting light from light source 36 onto the end of output fiber bundle 28 through filter 40 may be provided. However, proper operation has been obtained in one tested embodiment of the mechanism without the use of such an optical system.

Input fiber bundle 30 terminates in housing compartment **22*a* at a filter 44, selected to have filtering characteristics which allow the passage only of radiant energy which has a relatively "fast" rise time as is emitted by the desired phosphor component (such as blue) of the multiphosphor screen 12 of cathode ray tube 10, while "rejecting" relatively slow colors of radiant energy. Mounted directly behind filter 44 is a photomultiplier tube, generally designated 46, which tube should have a wave length response matching the output of the desired phosphor, such as the RCA IP28 type. Also provided in housing compartment 22*a* is a conventional amplifier generally designated 48, for amplifying the electrical signal generated by photomultiplier tube 46, under conditions where tube 46 is excited by radiant energy. The output signal from amplifier 48 may be connected through terminal 50 to control circuitry, as is desired. Suitable power may be provided to the electronic circuitry in housing 22 through terminal 52, projecting from housing 22**.

Tubular shaped light pencil 24 encases one end **26*a* of conduit 26, which end terminates near the front portion of the pencil. Provided at the forward end of pencil 24 is an optical system 56 for focusing light received at the pencil from light sources 36 via light bundle 28 onto screen 16 of cathode ray tube 10. Optical system 56 is selected and positioned with respect to the end 26*a* of the fiber bundle 28. The projected image defines the sample area as a spot or halo of light. Conversely, optical system 56 focuses radiant energy, detected at such working distance within said spot, onto the fiber end 26*a* of bundle 26 for transmission via input fiber bundle 30 to photomultiplier tube 46 in housing compartment 22*a***.

As an alternative to the use of the optical system 56, the end of the fiber bundle **26*a* can be ground into suitable shape to perform the function of the optical system 56**.

Referring to FIG. 5, it can be seen that the sheath or conduit 26 enclosing the fiber bundles 55 and the wires 32 terminates in a connector cap 86. The fiber bundles 55 pass through a clearance hole in the center of the insulator bushing 57. A bushing 59 fastened at the end of the fiber bundle serves to retain the spring 60 in place.

Electrical terminals 58 are also embedded in the insulator bushing 57 to which the wires 32 are connected. Insulating spacer 61 with clearance holes 62 and 63 provides support and insulation for the electrical connectors 58 and support for the fiber bundle 55 with the spring 60 and bushing (59) assembly.

Mating with the electrical connectors or pins 58 are the connectors or sockets 64 to which are fastened the wires 65. The connectors 64 are inserted in insulating spacers 66 in the metal bushing 69. The fiber bundle 85 goes through a clearance hole in the bushing 69 and has a bushing 67 and a spring 68 similar to those found on the end of bundle 55. The ends of the fiber bundles are both ground flat and make close contact with each other in the assembled connector. To prevent scattering of radiant energy, a fluid having a refractive index matching that of the light conducting fibers is placed on the flat ends of the fiber bundles before assembly.

When the connector is assembled, the pins 58 make contact with the sockets 64. Thus it is seen that the connector 101 provides both an optical and electrical connection.

The arrangement described above is to be taken only as illustrative. Other arrangements are possible. For example, by fastening the end of the fiber bundle in the bushing 69, the spring 68 could be eliminated. Different arrangements of sleeves, connectors, etc., are also possible.

Figure 4:
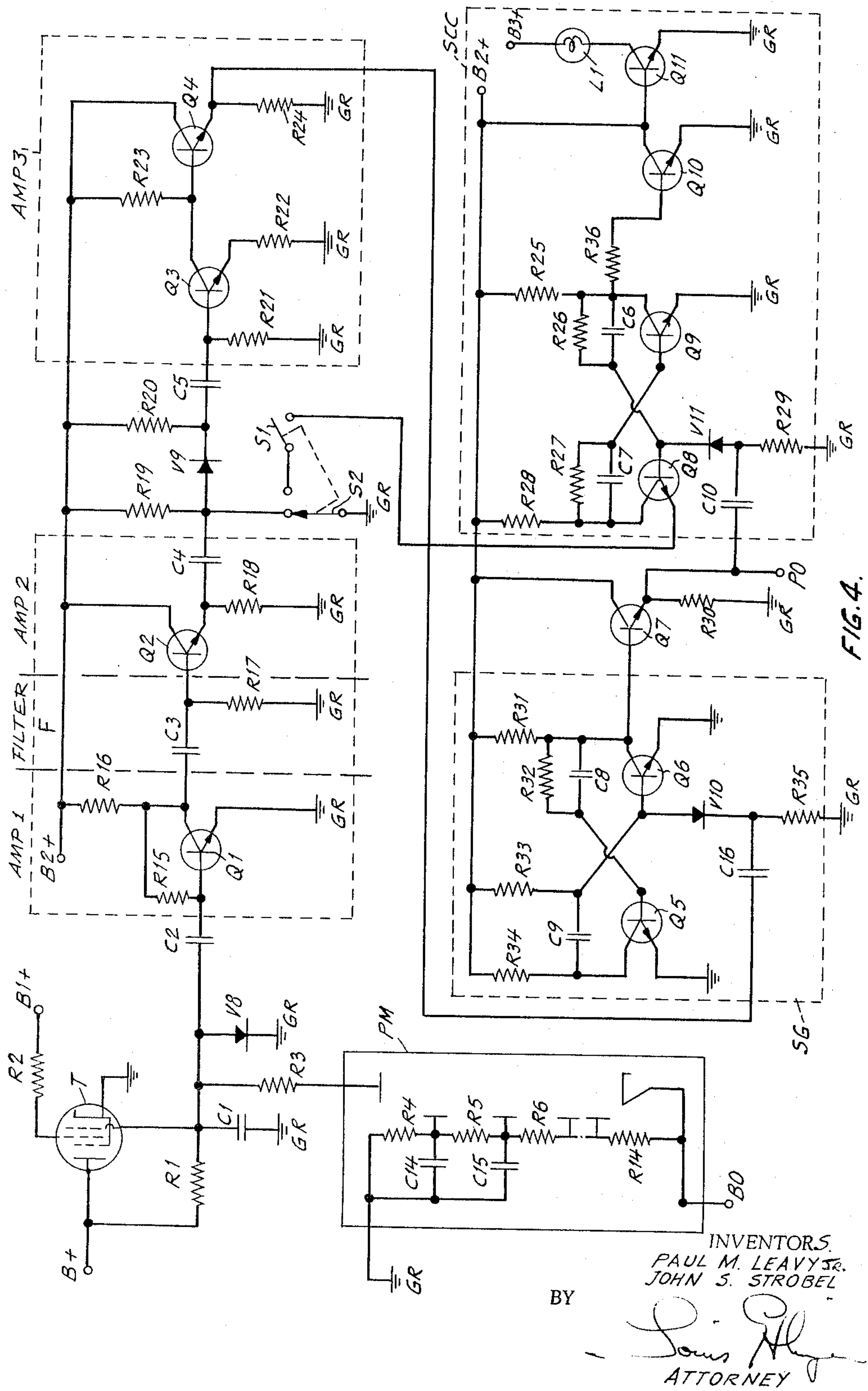
FIG. 4 is a simplified schematic wiring diagram of the electro-optical signal converter and supervisory circuitry.

Referring to the circuitry of FIG. 4, resistors are generally designated R, capacitors C, rectifiers V, transistors Q, and a vacuum tube T, with suffix numerals appended thereto to differentiate like circuit components one from the other. For simplicity, the heater element of tube T has been omitted. Unidirectional power of appropriate magnitude is supplied to the circuitry over supply lines B+, B1+, B0, B2+ and B3+ from a conventional power source (not shown), GR designating a ground connection to the ground of such power source.

PM designates a suitable photomultiplier tube for detecting radiant energy received from the surface of cathode ray tube 10 (FIG. 1) by light pencil 24 and conveyed by conduit 26 through input filter 44. Photomultiplier tube PM (FIG. 4) converts radiant energy signal pulses to electrical signal pulses for amplification by amplifiers, generally designated AMP1, AMP2 and AMP3 and shown in broken line outlines. The component within the broken outline designated as Filter passes only signals over a selected frequency bandwidth. The amplified electrical signal is then fed to a signal generator, designated SG and shown in broken line outline only, thence through an output transistor Q7; the signal pulse appearing across output resistor R30 for application to control circuitry as desired. The output pulse is also applied through capacitor C10 to the input of a supervisory control circuit generally designated SCC and shown in broken line outline.

Vacuum tube T in cooperation with its associated circuitry serves as a voltage regulator to maintain the photomultiplier tube current constant by controlling the voltage across the tube PM. This automatically adjusts the system gain to compensate for varying ambient illumination picked up by the light pencil and for variations in the brightness of the cathode ray tube without the intervention of the operator. The output signal pulse from photomultiplier tube PM is fed through amplifier AMP1, the filter F, amplifiers AMP2 and AMP3, signal generator SG and to the input of supervisory circuit SCC by means of capacitor couplings therebetween, the capacitors being selected to obviate the transmission of signal pulses of frequencies less than a predetermined frequency.

The manual, spring return switch 34 of FIG. 1, has one actuating button but consists of two switches, one of which is designated S2 (FIG. 4) and is a single pole, double throw switch, while the other one is designated S1 and is a single pole, single throw switch. Switches S1, S2 are mechanically connected for simultaneous actuation as indicated by the broken line interconnection, and are shown for the condition of push button 34 (FIG. 1) being unactuated. L1 (FIG. 4) designates the light source designated 36 in housing compartment 22b of FIG. 1.

In one tested embodiment of the electro-optical mechanism satisfactory operation has been obtained by providing a photomultiplier tube PM of the RCA IP28 type, vacuum tube I of the NU6842 type, transistors Q1 through Q4 of the 2N916 type and transistors Q5 through Q9 of the 2N708 type, while transistor Q10 was provided of the 2N760A type and Q11 of the 2N697 type. The values of the filter components are selected to transmit only the signals due to the fast rise time phosphor. Signals due to the D.C. or other slow time varying components are thus eliminated or effectively minimized.

To operate the mechanism, power is supplied to the circuitry of FIG. 4, energizing light source L1 (light source 36 FIG. 1). Light source 36 emits light which is filtered by filter 40, as previously described. The operator grasps pencil 24 and points it towards the selected character site from which a time-coincident electrical signal is desired. Light from light source 36 is focused through optical system 42 onto the input end of fiber bundle 28 for transmission through conduit 26 to the tube surface being investigated. The finder beam is projected from the end 26a of fiber bundle 28 through optical system 56 at the end of pencil 24 to a predetermined working distance from the end of the pencil. In one tested embodiment, a satisfactory working distance has been found to be one and one half (1½) inches from the end of the pencil, at which distance the image of the end 26a of fiber bundle 28 is focused onto a predetermined area of a size sufficient to encompass a character site. The pencil is held at such working distance from the inside phosphor coated face 16 of the screen 12 of the cathode ray tube 10 such that the projected finder beam captures one character or symbol site or a good portion thereof.

Radiant energy emitted at various character sites, as pencil 24 is passed over the face of cathode ray tube 10 to locate the desired site, is detected by phototube 46 (PM in FIG. 4). However, a corresponding output signal is not generated by the mechanism, since the output of amplifier AMP2 (FIG. 4) is connected to ground GR through the normally closed contacts of switch S2.

When the desired site is located by the "finder" beam, switch 34 (FIG. 1) is actuated and so held. Such actuation opens the normally closed contacts of switch S2 (FIG. 4) and closes the normally open contacts of switches S2 and S1. Opening of switch S2 removes the ground connection at the output of the amplifier AMP2. As the next succeeding writing pulse at the selected symbol site generates radiant energy, the leading edge of the blue phosphor or "fast" radiation is transmitted through input filter 44 (FIG. 1) to photomultiplier tube 46 (PM in FIG. 4) which detects the "fast" signal and converts it into an electrical signal. The electrical signal is amplified by amplifier 48 (AMP1 and AMP2 in FIG. 4) and filtered by the filter F to produce an output pulse which is fed through diode V9 to booster amplifier AMP3. Diode V9 and associated circuitry act as a final threshold to insure that the signal is at proper level for transmission.

The signal is fed thence to signal generator SG through coupling capacitor C16. This signal causes the flip-flop (Q5–Q6) of signal generator SG to transfer conduction from transistor Q6 to Q5. Such transfer, in turn, causes transistor Q7 to conduct through its emitter-collector circuit, producing an output signal across output resistor R30. This output signal may be fed through output terminals PO to control circuitry, as desired.

Thus, the radiant energy from the leading edge of the writing pulse is focused by optical system 56 (FIG. 1) of pencil 24 onto the end of input fiber bundle 26 for transmission to photomultiplier tube 46. Such radiant energy is filtered by filter 44 to transmit only the "fast" color radiant energy emitted by the blue phosphor of the multiphosphor coated screen. Such detection is amplified to produce an output electrical signal at output terminal PO (FIG. 4), which signal is time coincident with the leading edge of the writing pulse for the symbol at the selected symbol site.

It may be noted that such color filtration dissects the radiant energy detected at the selected symbol site to filter out the color radiant energy due to the one phosphor whose wave length is relatively long and is persistent, while receiving and transmitting only the "fast" phosphor color to the photomultiplier tube. In addition, the finder beam projected by the pencil is filtered by filter 40 (FIG. 1) to remove all light colors which are acceptable by input filter 44 at the input to photomultiplier tube 46. In this manner, only the leading edge of the writing pulse (e.g., blue radiation) is detected and caused to generate a time-coincident output signal. This prevents the persistence of the longer wave length phosphor (which has a slow rise and decay time) from interfering with the leading edge or obscuring the leading edge of the writing pulse and introducing random noise which may result in an unintelligible output signal. The slow decay of the longer wave length phosphor, if unfiltered, would overlap the leading edge of the next writing pulse and prevent its detection.

In order to determine whether or not the electro-optical mechanism is operating properly, the output signal pulse appearing across resistor 30 (FIG. 4) is also fed through capacitor C10 to the flip-flop circuit (Q8–Q9) of supervisory control SCC. Such output signal pulse causes transfer of conduction from transistor Q9 to Q8. The emitter electrode of transistor Q8 is presentely connected through switch S1 (presently closed) and switch S2 (presently thrown to the right) to ground GR to maintain transistor Q8 conducting. Such condition of the flip-flop is maintained until the release of switch 34 (FIG. 1) and, consequently, the reopening of switch S1 to remove the ground connection from the emitter electrode of transistor Q8.

Under such conditions, with transistor Q9 in non-conducting condition, transistor Q10 of the supervisory control SCC is caused to conduct. This, in turn, biases output transistor Q11 sufficiently to cause it to cease conducting through its emitter-collector circuit, extinguishing light source L1. With such de-energization of light source L1 (36 in FIG. 1) the "finder" beam of pencil 24 is extinguished, indicating visually to the operator that the desired time-coincident electrical signal output has been obtained and the electro-optical mechanism is functioning properly. The operator may then release switch 34 to restore switches S1 and S2 (FIG. 4) to their normal condition, as shown, and, in turn, restore the flip-flop (Q8–Q9) of supervisory control SCC to its normal condition. Transistor Q11 again conducts through its emitter-collector circuit, restoring light source L1 to illuminating condition to once more provide the "finder" beam for the light pencil.

It may be noted that, when the "finder" beam is automatically extinguished by the generation of the desired output electrical signal, subsequent writing pulses at the selected character site continue to be detected and cause generation of output signals at terminal PO.

Summarizing, the subject electro-optical system combines an optical system with a "finder" beam for focusing the beam to select a desired character site and establish a working distance to the site from which radiant energy is to be captured. This allows the pencil to be held at such distance without obscuring the display symbol which is being written. In addition, the finder beam at such working distance establishes a "capture" area which defines the area from which radiant energy will be detected. Radiant energy emanating from areas adjacent or exterior to such "capture" area do not affect the system, since the optical system 56 (FIG. 1) projects such extraneous energy beyond or in front of the end *26a* of fiber conduit 26, thereby preventing its transmission to photomultiplier tube 46. Thus, the mechanism is directional in that only radiant energy emitted within the "capture" area is focused onto the end of fiber input bundle 30 and transmitted thereby to the photomultiplier tube 46 for generation of the time-coincident electrical signal. The filter section in FIG. 4 further eliminates signals due to the ambient and slow time varying components emitted by the slow response phosphor.

In addition, light from light source 36 is filtered to provide a finder beam of a light color which is not accepted by filter 44 provided in front of the photomultiplier tube, the latter filter 44 accepting only "fast" light colors as may be emitted by the blue phosphor of the multiphosphor tube. This feature minimizes misoperation of the mechanism due to random noise from the multiphosphor screen. The supervisory control feature provides a visual check that the mechanism is operating properly.

In addition to the preferred embodiment described heretofore wherein display tubes having a multiphosphor screen are utilized, the system can be used with cathode ray tubes having a single phosphor screen. The system as described can be utilized to similarly generate an electrical signal which is time-coincident with a selected visual signal of instantaneous amplitude. The multiplier tube will have to be selected so that its wave length response matches the output of the phosphor used. Similarly the characteristics of the filter in FIG. 4 would have to be selected to give the desired response.

Other changes can be made in the system. For example, by selecting a light source which gives off colored light in place of the white light source 36, the filter 40 can be eliminated. The light source would have to be of a color which would not be transmitted by the filter 44.

On the other hand, if it is desired, both filters 40 and 44 can be eliminated by selection of suitable bias levels and filter components in the circuits shown in FIG. 4. The filter of FIG. 4 can be designed so that only the desired fast time varying components of the tracer are passed by the filter, thereby providing the desired output signal.

As many changes can be made in the above construction and many apparently widely different embodiments of this invention could be made without departing from the scope thereof, it is intended that all matter contained in the above description or shown on the accompanying drawings shall be interpreted as illustrative and not in a limiting sense.

What is claimed is:

1. In combination with a cathode ray display tube of the multiphosphor coated screen type having a writing beam controllable to write upon said screen,
   said screen emitting radiant energy at the point of impact of said writing beam as said writing beam scans across said screen,
   a radiant energy detector,
   a source of radiant energy,
   a light pencil,
   first light conducting fibers conveying radiant energy from said radiant energy source to said light pencil wherein said conducting fibers terminate,
   optical focusing means for focusing said conveyed radiant energy into a beam projecting from said light pencil onto an area external to said pencil and at a predetermined distance from the said termination of said first light conducting fibers in said pencil,
   second light conducting fibers also terminating in said light pencil for conveying radiant energy from said pencil to said radiant energy detector, and
   said optical focusing means focusing radiant energy emitted at said area by said screen onto the end of said second light conducting fibers for transmission to said detector, under conditions where said beam is projected onto said tube screen at said predetermined distance, 2. In combination with a cathode ray display tube of the multiphosphor coated screen type having a writing beam controllable to write upon said screen,
said screen emitting radiant energy at the point of impact of said writing beam as said writing beam scans across said screen,
a radiant energy detector,
a source of radiant energy,
a light pencil,
first light conducting fibers conveying radiant energy from said source to said light pencil wherein said light conducting fibers terminate,
optical focusing means for focusing said conveyed radiant energy into a beam projecting from said pencil onto an area external to said pencil and at a predetermined distance from the said termination of said first light conducting fibers in said pencil,
second light conducting fibers also terminating in said light pencil for conveying radiant energy from said pencil to said radiant energy detector,
said optical focusing means focusing radiant energy emitted at said area by said screen onto the end of said second light conducting fibers for transmission to said detector, under conditions where said beam is projected onto said tube screen at said predetermined distance,
an optical filter interposed between said second light conducting fibers and said radiant energy detector,
said filter being selected to filter all radiant energy except that of a predetermined color,
and a second optical filter interposed between said light source and said first light fibers and having characteristics to filter light of said predetermined color.

3. In combination with a cathode ray display tube of the multiphosphor coated screen type having a writing beam controllable to write upon said screen,
said screen emitting radiant energy at the point of impact of said writing beam as said writing beam scans across said screen,
a radiant energy detector,
a source of radiant energy,
a light pencil,
first light conducting fibers conveying radiant energy from said source to said light pencil wherein said light conducting fibers terminate,
optical focusing means for focusing said conveyed energy into a beam projecting from said pencil onto an area external to said pencil and at a predetermined distance from said termination of said first light conducting fibers in said pencil,
second light conducting fibers also terminating in said light pencil for conveying radiant energy from said pencil to said radiant energy detector,
said optical focusing means focusing radiant energy emitted at said area by said screen onto the end of second light conducting fibers for transmission to said detector, under conditions where said beam is projected onto said tube screen at said predetermined distance,
an optical filter interposed between said second light conducting fibers and said radiant energy detector,
said source of radiant energy being selected to produce radiant energy having a frequency characteristic which will not be transmitted by said filter.

4. A system for providing an electrical signal representative of the instantaneous amplitude of a visual pulse signal.
said system comprising a cathode ray display tube having a multiphosphor coated screen which emits radiant energy characteristic of at least two types of phosphors in response to the impingement of a cathode ray writing beam upon said screen,
said writing beam sweeping said screen to emit radiant energy at predetermined areas of emission provided on said screen closely adjacent one to the other, a remote housing having two compartments,
a light source provided in a first one of said compartments,
a photodetector provided in the second one of said compartments for generating an electrical signal in response to stimulation by radiant energy,
a portable light pencil,
a conduit of light conducting fibers connecting said remote housing to said pencil,
said light conducting fibers terminating at one end within said pencil and at the other end being separated into two bundles of light conducting fibers,
a first one of said bundles terminating adjacent said light source in said first compartment,
the other of said bundles terminating in close proximity to said photodetector in said second compartment,
an optical filter interposed between said photodetector and said other fiber bundle,
said filter being selected of characteristics to accept only radiant energy emitted by a certain phosphor component of said multiphosphor coated screen,
said light source being selected to produce radiant energy having a frequency characteristic which will not be transmitted by said optical filter.

5. A system for providing an electrical signal representative of the instantaneous amplitude of a visual pulse signal,
said system comprising a cathode ray display tube having a multiphosphor coated screen which emits radiant energy characteristic of at least two types of phosphors in response to the impingement of a cathode ray writing beam upon said screen,
said writing beam sweeping said screen to emit radiant energy sequentially at predetermined areas of emission provided on said screen closely adjacent one to the other,
a remote housing having two compartments,
a light source provided in a first one of said compartments,
a photodetector provided in the second one of said compartments for generating an electrical signal in response to stimulation by radiant energy,
a portable light pencil,
a conduit of light conducting fibers connecting said remote housing to said pencil,
said light conducting fibers terminating at one end within said pencil and at the other end being separated into two bundles of light conducting fibers,
a first one of said bundles terminating adjacent said light source in said first compartment,
the other of said bundles terminating in close proximity to said photodetector in said second compartment,
a first optical filter interposed between said light source and said first fiber bundle,
a second optical filter interposed between said photodetector and said other fiber bundle,
said second optical filter being selected of characteristics to accept only radiant energy emitted by a certain phosphor component of said multiphosphor coated screen,
said first optical filter rejecting radiant energy having the characteristics of radiant energy accepted by said second optical filter.

6. A system for providing an electrical signal representative of the instantaneous amplitude of a visual pulse signal, said system comprising:
a cathode ray display tube having a multiphosphor coated screen which emits radiant energy characteristic of at least two different types of phosphors in response to the impingement of a cathode ray writing beam upon said screen,
said writing beam sweeping said screen to emit radiant energy sequentially at predetermined areas of emission provided on said screen closely adjacent one to the other, a remote housing having two compartments,
a light source provided in a first one of said compartments,
a photodetector provided in the second one of said compartments for generating an electrical signal in response to stimulation by radiant energy,
a portable light pencil of tubular cross-sectional area,
a conduit of light conducting fibers connecting said remote housing to said pencil,
said light conducting fibers terminating at one end within said pencil and at the other end being separated into two bundles of light conducting fibers,
a first one of said bundles terminating adjacent said light source in said first compartment,
the other of said bundles terminating in close proximity to said photodetector in said second compartment,
a first optical filter interposed between said light source and said first fiber bundle,
a second optical filter interposed between said photodetector and said other fiber bundle,
said first optical filter being selected of characteristics to accept only radiant energy emitted by a certain phosphor component of said multi-coated screen,
said second optical filter rejecting radiant energy having the characteristics of radiant energy accepted by said first optical filter,
and optical focusing means being provided at said light pencil for focusing light transmitted thereto from said light source through said first optical filter into a finder beam defining a predetermined capture area at a predetermined working distance from the termination of said light bundles and for focusing radiant energy emitted within said area onto the end of said light bundles for transmission to said photodetector in said remote housing.

7. The combination as set forth in claim 6 wherein said photodetector means includes manually operated means for controlling said photodetector means to detect a selected area of emission on said screen and at the same time extinguish said finder beam.

8. The combination of claim 7 wherein said manually operated means includes:
a switch located on said light pencil,
electrical conductors connected between said switch and said photodetector means and an electro-optical connector located between said light pencil and said photodetector whereby both said electrical conductors and said light conducting fibers can be disconnected to form two assemblies having each a light conducting fiber bundle and electrical conductors.

9. The combination of claim 8 wherein said electro-optical connector consists of means for bringing one end of said light conductive fiber bundles of each said assemblies into intimate contact with each other,
plug and socket means for connecting the electrical conductors of each of said separate assemblies,
and material having a refractive index of the same magnitude as that of said light conductive fibers placed between the open ends of said light conductive fibers.

10. A system as set forth in claim 6 including supervisory control means and signal generation control means, said signal generation control means preventing generation of electrical signals by said system in response to detected radiant energy by said detecting means and actuatable to allow such signal generation,
said supervisory control means including means operative automatically in response to generation of said signal to cause said light source and finder beam to be extinguished,
said supervisory control means including means responsive to return of said signal control means to unactuated condition to return said light source to illuminating condition.

11. In combination with a cathode ray display tube of the phosphor coated screen type having a writing beam controllable to write upon said screen, said screen emitting radiant energy at the point of impact of said writing beam as said writing beam scans across said screen,
radiant energy detector means for producing electric signals in response to radiant energy,
a light source,
output light conducting fibers conveying radiant energy from said light source to a light pencil,
input light conducting fibers terminating in said light pencil for conducting light from said pencil to said detector means, and means to generate an electrical signal time-coincident with a selected point of impact of said writing beam.

12. The system as set forth in claim 11 wherein manually controlled means are included for permitting the signals from said radiant energy detecting means to be transmitted and for concurrently deactivating said light source.

13. In combination with a cathode ray display tube having
a multiphosphor coated screen and a writing beam controllable to write upon said screen,
said screen being coated with a first phosphor having a first frequency characteristic and a second phosphor having different frequency characteristics,
said screen emitting radiant energy consisting of frequencies from both phosphors at the point of impact of said writing beam as said writing beam scans across said screen,
light detection means solely responsive to one spectral wavelength for generating a corresponding electrical signal,
a light source,
a light pencil,
output light conductive fibers conveying light from said light source to said light pencil,
optical focusing means for focusing said conveyed light from said light pencil onto an area external to said pencil and at a predetermined distance from said pencil,
input light conducting fibers terminating in said light pencil for conducting light from said pencil to said detection means,
said optical focusing means capturing light emitted at said area and focusing said light onto said input light conductive fibers.

14. The combination of claim 13 wherein output optical filter means are interposed between said light source and said output light conducting fibers and selected for rejecting light of said spectral wavelength acceptable by said light detection means.

15. In combination with a cathode ray display tube of the multiphosphor coated screen type having a writing beam controllable to write upon said screen,
said screen emitting light of several wavelengths at the point of impact of said writing beam as said writing beam scans across said screen,
a detector responsive to light energy for generating a corresponding electrical signal,
a light source,
a cylindrical probe, output light conducting fibers conveying light from said light source to said probe,
optical focusing means for focusing said conveyed light from said probe onto an area external to said probe and at a predetermined distance from said probe,
input light conducting fibers terminating in said probe for conducting light from said probe to said detector,
said optical focusing means capturing light emitted at said area and focusing such captured light onto said input light conducting fibers,
input optical filter means interposed between said input light conducting fibers and said detector and selected for accepting only light of one desired wavelength,
an output optical filter means interposed between said light source and said output light conducting fibers and selected for rejecting light of said desired wavelength.

16. The combination set forth in claim 15 wherein said output light conducting fibers and input light conducting fibers join in a Y configuration to form one flexible multifiber conduit to said probe, said output light conducting fibers being positioned at the periphery of said conduit to cause said conveyed light to be focused as a halo defining said external area.

17. The combination set forth in claim 16 wherein said signal and output light conducting fibers are randomly positioned in said conduit.

18. In combination with a cathode ray display tube of the multiphosphor coated screen type having a writing beam controllable to write upon said screen, said screen emitting light of several spectral wavelengths at the point of impact of said writing beam as said writing beam scans across said screen, said emitted light having time varying phosphor components, detecting means for producing electric signals in response to said emitted light, a light source, a light probe, output light conveying fibers conducting light from said light source to said light probe, optical focusing means for focusing said conveyed light from said light probe onto an area external to said probe and at a predetermined distance from said probe, input light conducting fibers terminating in said light probe for conducting light from said probe to said detecting means, said optical focusing means capturing light emitted at said point of impact and focusing said light onto said input conducting fibers, said detecting means producing signals in response to the time varying phosphor component only of light of desired wavelengths.

19. The combination set forth in claim 18 wherein said detector means comprises:

photomultiplier means to produce an output voltage in response to radiant energy, amplifier means to amplify signals from said photomultiplier means, and filter means to pass signals from said amplifier representing the time varying component of the phosphor emitting light of desired wavelengths.

20. The combination set forth in claim 19 further including voltage regulating means to maintain the voltage across said photomultiplier means to thereby automatically maintain the system gain to compensate for varying ambient illumination and variation in brightness of said cathode ray tube.

21. The combination set forth in claim 20 further including signal generating means to produce an output signal from said amplifier.

22. The combination set forth in claim 21 further including supervisory control means for automatically turning off said light source when a selected point on said screen activated by said writing beam is detected by said detecting means.

23. The combination set forth in claim 22 wherein said photomultiplier means comprises a photomultiplier tube whose wavelength response matches the output of the phosphor having the fastest rise time characteristic.

24. In combination with a cathode ray display tube having a screen coated with a first and second phosphor and having a writing beam controllable to write upon said screen, said first phosphor having a fast rise and decay time characteristic, said second phosphor having a longer rise and decay time characteristic than said first phosphor, said screen emitting light of several spectral wavelengths at the point of impact of said writing beam as said writing beam scans across said screen, said emitted light having time varying phosphorus components, detecting means producing electric signals in response to said emitted light, a light source, a light pencil, output light conductive fibers conveying light from said light source to said light pencil, optical focusing means for focusing said conveyed light from said light pencil onto an area external to said pencil and at a predetermined distance from said pencil, input light conducting fibers terminating in said light pencil for conducting light from said pencil to said detecting means, said optical focusing means capturing light emitted at said point of impact and focusing said light onto said input conductive fibers, said detecting means producing signals in response to the time varying phosphor component only of the phosphor having the fast rise and fall time characteristic.

25. The combination set forth in claim 24 which said detecting means includes regulating means to automatically compensate for varying ambient illumination and variation in brightness of said cathode ray tube.

References Cited by the Examiner

UNITED STATES PATENTS

| | | | |
|---|---|---|---|
| 2,903,690 | 9/1959 | Slack | 250—227 X |
| 3,068,739 | 12/1962 | Hicks et al. | 250—227 X |
| 3,130,317 | 4/1964 | Connelly et al. | 250—227 |
| 3,164,663 | 1/1965 | Gale | 250—227 X |

RALPH G. NILSON, *Primary Examiner.*

WALTER STOLWEIN, *Examiner.*